（12） United States Patent
Williams (10) Patent No.: US 8,553,286 B2
(45) Date of Patent: Oct. 8, 2013

(54) HALFTONING METHOD AND APPARATUS USING TEMPLATES INDEXED BY CODE

(75) Inventor: Leon Williams, Walworth, NY (US)

(73) Assignee: Electronics for Imaging, Inc., Foster City, CA (US)

( * ) Notice: Subject to any disclaimer, the term of this patent is extended or adjusted under 35 U.S.C. 154(b) by 0 days.

(21) Appl. No.: 13/490,374

(22) Filed: Jun. 6, 2012

(65) Prior Publication Data

US 2012/0314261 A1 Dec. 13, 2012

Related U.S. Application Data

(60) Provisional application No. 61/494,476, filed on Jun. 8, 2011.

(51) Int. Cl.
*H04N 1/405* (2006.01)
*H04N 1/409* (2006.01)
*G06K 15/00* (2006.01)
*G06T 5/00* (2006.01)
*G06T 9/00* (2006.01)

(52) U.S. Cl.
USPC ........ 358/3.06; 358/3.23; 358/3.27; 382/237; 382/254

(58) Field of Classification Search
USPC .......... 358/1.2, 1.9, 2.1, 3.06, 3.13, 3.2, 3.21, 358/3.23, 3.27, 528, 532, 534–536, 358/447–449, 462; 345/589, 596–599, 660, 345/666, 667, 671; 382/237, 254, 266, 274, 382/298, 299

See application file for complete search history.

(56) References Cited

U.S. PATENT DOCUMENTS

| | | | | |
|---|---|---|---|---|
| 5,982,508 | A * | 11/1999 | Kashihara | 358/3.08 |
| 7,355,744 | B2 * | 4/2008 | Hattori | 358/1.2 |
| 7,583,412 | B2 | 9/2009 | McElvain et al. | |
| 7,920,293 | B2 * | 4/2011 | McElvain et al. | 358/3.13 |
| 8,107,772 | B2 * | 1/2012 | Ohkawa | 382/299 |
| 2007/0279652 | A1 | 12/2007 | McElvain et al. | |
| 2007/0279693 | A1 * | 12/2007 | McElvain et al. | 358/3.06 |
| 2008/0144057 | A1 | 6/2008 | McElvain | |
| 2009/0059255 | A1 | 3/2009 | Ohide | |
| 2010/0040291 | A1 | 2/2010 | Genda et al. | |
| 2010/0134809 | A1 | 6/2010 | Chang | |

\* cited by examiner

*Primary Examiner* — Scott A Rogers
(74) *Attorney, Agent, or Firm* — Michael A. Glenn; Perkins Coie LLP (57) ABSTRACT

Techniques are provided that use one or more templates to improve the printing of non-saturated colored text and lines. Such templates are predetermined, fixed patterns which can be indexed or looked up via a code word with a fewer number of bits than in the corresponding template. Thus, such templates are used to increase the resolution or effective resolution of a display. In an embodiment, each template location represents a 4×4 region of binary pixels. The number of possibilities of template values is $2^{(4*4)}$ or 65,536. However, in accordance with an embodiment, only 256 of these 65,536 templates are available and are indexed by an 8 bit contone video value.

6 Claims, 5 Drawing Sheets

| Aux Data Tag bit definition | Print Engine Pixel Processing |
|---|---|
| 0000 | Print Engine Image Processing will .... The halftone that will be applied is... |
| 0001 | Apply the ... screen |
| 0010 | Apply the 175 lpi ... to the pixel |
| 0011 | Apply ... to the pixel |
| 0100 | Apply the ... screen |
| 0101 | Apply ... to the pixel (for saturated objects) |
| 0110 | Unused |
| 0111 | Unused |
| 1000 | Unused |
| 1001 | Unused |
| 1010 | Apply ... |
| 1011 | Apply ... |
| 1100 | Apply ... |
| 1101 | Apply ... |
| 1110 | Apply ... |
| 1111 | Apply ... |

HALFTONING METHOD AND APPARATUS USING TEMPLATES INDEXED BY CODE

CROSS REFERENCE TO RELATED APPLICATIONS

This patent application claims the benefit of U.S. Provisional Patent Application Ser. No. 61/494,476, HALFTONING METHOD AND APPARATUS, filed Jun. 8, 2011, the entirety of which is incorporated herein by this reference thereto.

BACKGROUND OF THE INVENTION
TECHNICAL FIELD

This invention relates generally to the field of digital display and printing devices. More specifically, this invention relates to increasing the resolution or effective resolution for a digital display or printer.

DESCRIPTION OF THE RELATED ART

Presently, certain techniques exist for printing halftones with grayfont. For instance, XEROX CORPORATION, headquartered in Norwalk, Conn. provides several techniques on how to print halftones with grayfont.

As one example, J. McElvain and C. M. Hains, U.S. 2007/0279652, SYSTEM AND METHOD FOR PATTERNED ENCODED HALFTONING (published Dec. 6, 2007; herein referred to "document '652") discusses a way of reproducing an image by receiving an input contone array of M contone data values. Specifically, McElvain et al describes how color printers, due to memory constraints, often have only a few preconfigured screens. A printer controller may have the capability to change between these screens at a page boundary or within a page on an object-tag basis. However, the controller cannot configure the engine to use a different screen that may be more appropriate for a particular application. Thus, the user is limited to using the predefined image screens, even though another screen (not predefined) may be more appropriate for the imaging application. As a result, the image rendering may be sub-optimal. (See last sentence of the Background section.) The '652 document further describes, in the Summary section, a technique that reproduces an image by receiving an input contone array of M contone data values. The contone data values may lie within a range from 1 to N. The embodiment includes comparing each contone data value to an array of M sets of pattern look-up tables to generate an array of M pattern values. M may be a number of one or more. Each pattern value in the array of M pattern values may be decoded to a corresponding K by L multi-pixel pattern of binary data. The binary data is rendered by a reprographic device. FIG. 4 of the '652 document shows a super-resolution encoded (SRE) halftoning system. Such system includes an SRE halftoner that uses a Holladay dot for encoding and a super-resolution decoding (SRD) module for decoding the SRE halftoned image into a binary image. The decoded SRE patterns are used in printing to improve rendering of edges and corners when used in conjunction with techniques such as anti-aliasing.

As another example, consider J. McElvain and C. M. Hains, U.S. Pat. No. 7,583,412, SYSTEM AND METHOD FOR CREATING PATTERNED ENCODED HALFTONES, Sep. 1, 2009 (herein referred to as "document '412"). Document '412 describes, in the Summary section, a mechanism that converts a contone-to-binary halftoning array to a contone-to-encoded pattern halftoning array. The contone-to-binary halftoning array is configured to be used in image processing to convert an input contone array of contone data values to an output binary array of binary data values based on comparing each contone data value to each threshold value. The contone-to-encoded pattern halftoning array is configured to convert an input contone array of contone data values to an output encoded array of pattern values based on comparing each of the contone data values to each set of pattern look-up tables, wherein the comparison generates M encoded pattern values for each contone data value and each encoded pattern value or "code" corresponds to a multi-pixel pattern of binary data values in a library. The mechanism may include replicating the threshold values into a replicated array and dividing the replicated array into M blocks of threshold values. At each contone data level, the blocks of threshold values are converted to binary data values to form a desired pattern in the block. At each contone data level, the desired pattern in each block is correlated to a multi-pixel pattern in the library and a pattern value or "code" corresponding to the multi-pixel pattern is entered in an array for the block, thereby generating M sets of arrays. The M sets of arrays are compiled to populate M sets of pattern look-up tables to forming the contone-to-encoded pattern halftoning array.

As another example, consider J. McElvain, US 2008/0144057, SUPER CELL SUPER-RESOLUTION ENCODING, Jun. 19, 2008 (hereinafter "document '057"). Document '057 discusses a technique that represents patterns using a super resolution encoding method that distributes the code value among adjacent pixels. One or more blocks are created, wherein each block is comprised of a plurality of bits, the height of the block is equal to the width of the block. One or more supercells are created by merging at least two adjacent blocks. One or more patterns are defined, wherein each pattern is defined by selecting one or more bits to be one of filled or unfilled within each supercell. Each of the one or more patterns is associated with an SRE code, the SRE code is related to the number and location of bits that are filled within the pattern. A pattern is defined with a plurality of patterns, each pattern is included in the one or more supercells.

SUMMARY OF THE INVENTION

Techniques are provided that use one or more templates to improve the printing of non-saturated colored text and lines. In the context of this discussion, templates are predetermined, fixed patterns which can be indexed or looked up via a code word with a fewer number of bits than in the corresponding template. Thus, in an embodiment, such templates are used to increase the resolution or effective resolution of a display. In an embodiment, each template location represents a 4×4 region of binary pixels. The number of possibilities of template values is $2^{(4*4)}$ or 65,536. However, in accordance with an embodiment, only 256 of these 65,536 templates are available and are indexed by an 8 bit contone video value.

DETAILED DESCRIPTION OF THE INVENTION

An embodiment increases the resolution or effective resolution of a display, a printer, a set of printers, a set of displays, or combinations thereof. An example of a type of printer on which such embodiment may be implemented is, but is not limited to, Xerox DocuColor™ 7000/8000 by XEROX CORPORATION, headquartered in Norwalk, Conn. ("Xerox"). It should be appreciated that certain features and aspects of halftoning may be described herein in the context of a digital printer, but that referencing a digital printer is meant by way of example only and is not meant to be limiting. Other digitally rendering devices or operations, such as for example digital displays, may be contemplated by one skilled in the art.

Overview

To improve text quality, Xerox introduced a method referred to as "grayfont" to support their printers containing Vertical-Cavity Surface-Emitting Laser Diode Array (VCSEL-ROS) in 2006. For further understanding and further details about VCSEL-ROS, one skilled in the art may refer to an article of the same title, which can readily be found in the Technical Report section of the company's website, for example, fujixerox.com/eng/company/technology/technical_report/16/s_02_e.html. One problem being addressed was how to improve the text and line quality of a 600 dots per inch (dpi) digital printer without major changes to the interface. One solution included providing four 8-bit bytes of video data, e.g. contone CMYK, for each pixel printed by the printer. One problem with this approach is that fully saturated text, i.e. black text, does not need 8 bits, e.g. 256 gray levels, of information but rather higher resolution. That is, fully saturated text may need 1200 or 2400 dpi binary representation to appear smooth and without jagged edges.

To accommodate such need, a set of templates or patterns were devised or generated such that an 8 bit video may represent either one of 256 gray levels or one of 256 binary patterns. As well, an additional signal or tag was generated and used to define which of the above-two distinct methods of interpretation is to be used for each pixel. Accordingly, one tag value is generated and/or used for each pixel.

One embodiment uses such tagging mechanism or tag control to generate and use the binary representation for saturated text and the contone data were generated and used for pictures.

However, even with such tagging mechanism in use, typical buyers of printers believed that it could not be possible to print in "true 1200 dpi" or "true 2400 dpi" with higher resolution printers such as, but not limited to, 2400 dpi printers in the market.

Templates for True 1200 dpi Printing

One embodiment described hereinbelow provides, but is not limited to, a template, compatible with existing datapaths, hardware, and table sizes, that is configurable for actual 1200 dpi printing. Such template is based on the aspect that because each pixel of 1/600 resolution may be printed by a 4-by-4 square of pixels of 1/2400 binary resolution (the laser beam exposure system is 2400 dpi, with the laser being on or off, thus, binary), it is possible to generate a set of one or more templates each of which represent 1200 pixels, for example, but not limited to, a 2-by-2 square of binary pixels, encoded as 2 bits.

Figure 1:
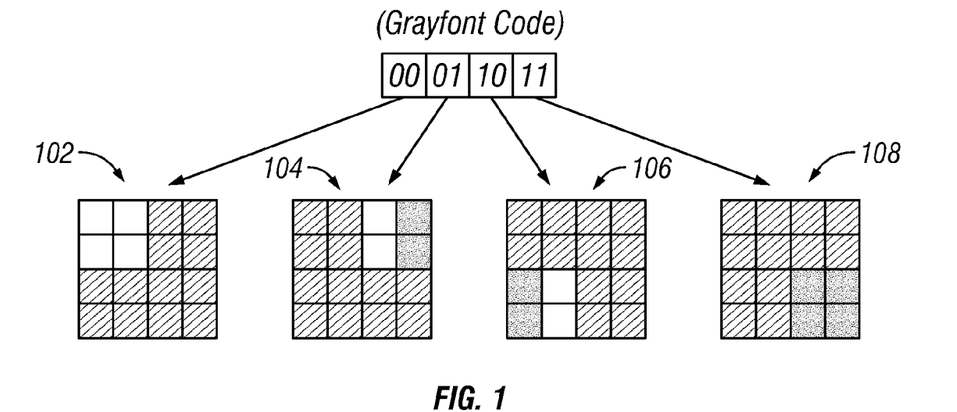
FIG. 1 is a schematic diagram showing 1200 dpi rendering; according to an embodiment.

One embodiment can be understood with reference to FIG. 1, a schematic diagram showing 1200 dpi rendering. Specifically, FIG. 1 shows how 1200 dpi may be rendered by 2 bit rendering. In this embodiment, code 00 corresponds to a 2-by-2 matrix of binary pixels in the top left corner with no saturation 102. Code 01 corresponds to a 2-by-2 matrix of binary pixels in the top right corner having full saturation in the two rightmost pixels at the top 104. Code 10 corresponds to a 2-by-2 matrix of binary pixels at the bottom left corner with full saturation in the two leftmost pixels at the bottom 106. Code 11 corresponds to a 2-by-2 matrix of binary pixels at the bottom right corner with full saturation in all four of the pixels 108. It should be appreciated that the use of such templates allows a printer to better render non-saturated colored text and line objects.

Figure 2:
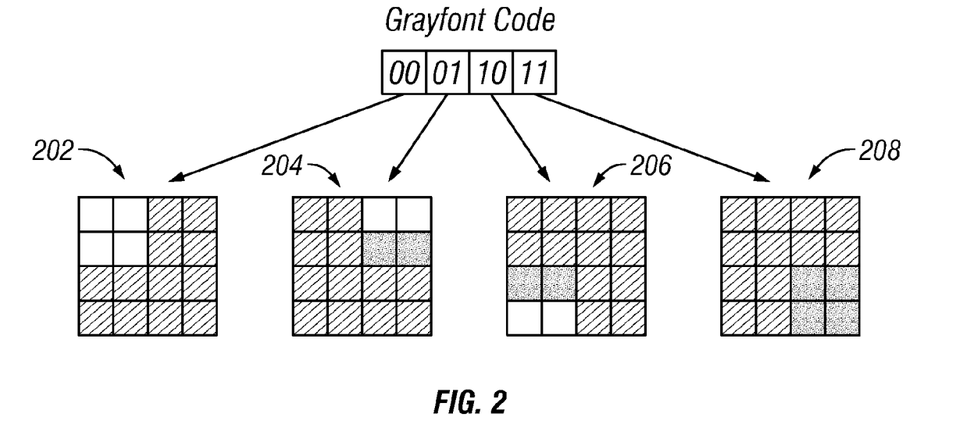
FIG. 2 is a schematic diagram showing 1200 dpi rendering; according to an embodiment.

Another embodiment can be understood with reference to FIG. 2, a schematic diagram showing 1200 dpi rendering. Specifically, FIG. 2 shows how 1200 dpi may be rendered by 2 bit rendering. In this embodiment, code 00 corresponds to a 2-by-2 matrix of binary pixels in the top left corner with no saturation 202. Code 01 corresponds to a 2-by-2 matrix of binary pixels in the top right corner having full saturation in the two bottommost pixels at the top 204. Code 10 corresponds to a 2-by-2 matrix of binary pixels at the bottom left corner with full saturation in the two topmost pixels at the bottom 206. Code 11 corresponds to a 2-by-2 matrix of binary pixels at the bottom right corner with full saturation in all four of the pixels 208. It should be appreciated that the use of such templates allows a printer to better render non-saturated colored text and line objects. It should further be appreciated that by using such templates, the 1/2400 pixels are enabled, e.g. turned on, in rows rather than columns. This alternative may be advantageous when the laser system bandwidth is limited and cannot be fully engaged/disengaged at the 1/2400 rate.

Figure 3:
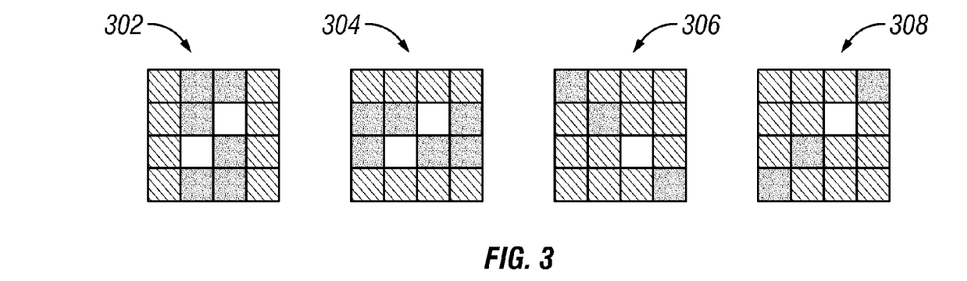
FIG. 3 is a schematic diagram showing example out of phase 1200 dpi non-saturated lines that are not accommodated by saturated templates, according to an embodiment.

For purposes of understanding, reference is made to FIG. 3, a schematic diagram showing example out of phase 1200 dpi non-saturated lines that are not accommodated by saturated templates. FIG. 3 shows two 2×2 matrices of binary pixels 302 that appear in the middle, column-wise, of the pixels of a given line. The topmost 2×2 matrix has full saturation in the topmost and left pixel. The right pixel is disengaged. The 2×2 matrix at the bottom has the left-top pixel disengaged and the remaining three pixels are all engaged. The second block of pixels 304 of a line has two 2×2 matrices of binary pixels in the middle, row-wise.

The leftmost matrix has full saturation in the top two and bottom left pixels and a disengaged pixel at the bottom right. The rightmost matric has a disengaged pixel at the top left pixel and the remaining three pixels are all engaged.

The next two blocks of FIGS. 3, 306 and 308, respectively, show two 2×2 matrices, respectively, on the diagonals. That is, the top left matrix of block 306 has two engaged pixels on the diagonal. The bottom right matrix has the top diagonal pixel disengaged and the bottom pixel engaged. The top right matrix of block 308 has the top right pixel engaged and the bottom left pixel disengaged. The bottom left matrix of block 308 has both the top right and the bottom left pixels engaged.

It should be appreciated that many permutations are possible. For example, in accordance with one or more embodiments herein, a specific tag is reserved for 1200 dpi and the possible programming of the corresponding templates may vary.

As well, in another embodiment, the templates may not render exact 1200 dpi. For example, templates may be modified somewhat based on a review of temporary results.

In another embodiment, additional codes may be introduced and used for obtaining additional or different results.

Some Exemplary Uses of Templates for True 1200 dpi Printing

Using embodiments of above-discussed templates enables optimum rendering of non-saturated colored text and line objects. In an embodiment, the edge of a non-saturated line must be represented by a grouping of ¹/₂₄₀₀ pixels in which some of the pixels are engaged, i.e. on, and some are disengaged, i.e. off. It should be appreciated that if all pixels were engaged, the line would be fully saturated. By allowing multi-bit, in this case 2-bit, control of each of the ¹/₁₂₀₀ pixels, a partially saturated line with edge resolution of ¹/₁₂₀₀ can be constructed. The templates constructed for increased resolution of only saturated edges do not contain the required templates.

Figure 4:
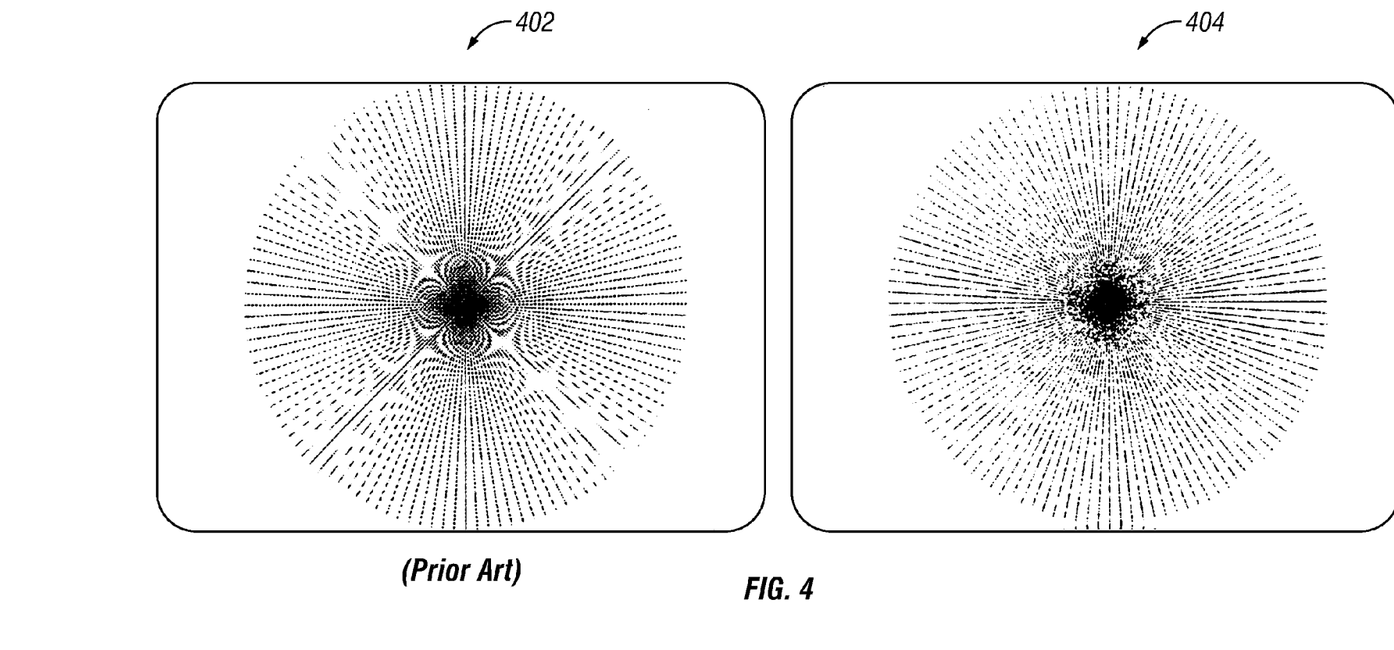
FIG. 4 is a schematic diagram showing the effect of non-saturated lines approaching the angle of halftone, according to the prior art and according to an embodiment.

Further, standard amplitude modulation (AM) halftones have a frequency and angle. When a non-saturated line approaches the angle of the halftone, aliasing or beating of the line and halftone frequencies occurs. An example of the effect of such non-saturated lines approaching the angle of the halftone is shown in FIG. 4 402. As can be seen, the lines emanating from the center show an unintended pattern of repeated ripples. In contrast, the lines in 404 emanate from the center with uniformity and consistency. This is because such lines in 404 are printed using 1200 template saturated lines, in accordance with embodiment herein. With the 1200 2-bit representation discussed herein, a stochastic screen can be constructed which prevents aliasing.

New Templates Fitting into the Older Representations

It should further be appreciated that because the permutations of 1200-by-2 bits can be represented in an 8 bit value, such new templates can fit into the older representation, e.g. four 1200-by-2 pixels can fit in the same byte as a ¹/₆₀₀ 8 bit pixel. This is because the 8 bit value can index 2^8 or 256 templates. Each of the 1200-by-2-bit entries requires 2^2 or 4 sub-templates. To represent all permutations of the 2×2 sub templates, the 4×4 template requires 4*4*4*4 or 256 template entries. Another way to think of this is each of 2-bit groups within the 8-bit pixel addresses a separate sub-template in one of the 4 quadrants of the 4×4 template, for example, as demonstrated in the figures referenced above.

Discussion of an Example Problem

Historically, a method for enhancing the resolution of printing included the task of assigning the 256 levels or the 8 bits per pixel per color pane, e.g. a CMYK color pane, via one or more different ways. One particular method included recognizing that a 600 dpi pixel has 8 bits associated with it. Thus, such pixel may have 256 gray levels associated with it.

Thus, as mentioned above, if a tag bit was set for a particular pixel in a specific way, instead of interpreting those 8 bits as 256 gray levels, the tag may cause such 8 bits to be interpreted as one of a number of templates.

Thus, any of these templates may drive the laser in that ¹/₆₀₀th square. Such template may actually drive the printer or the laser at 2400×2400 dots per inch. Further, because there are effectively 16 bits in that four-by-four square of the 600 dpi within the 2400 dpi, only a certain number of templates can be used.

Such templates were used to improve edge definition of line drawings and character fonts. However, one of the limitations of these templates was that the use of such templates could not represent very effectively non-saturated colored texture lines. See, for example, FIG. 4 402, which illustrates standard non-saturated lines.

Discussion of a Solution to the Problem

One embodiment provides, instead of using the above-mentioned 8 bits either for contone or for one of the above-mentioned 256 templates that represents a binary four-by-four square within the 600 dpi pixel, one or more templates as two bits per pixel at 1200 dpi.

Thus, in accordance with the embodiment, a ¹/₆₀₀th square is divided into four quadrants. Each of the two bits of the 8 bits is used to program the contone level at one of four levels, zero, one, two or three, because the unit used is two bits. Thus, it is possible to program the ¹/₁₂₀₀th individually and get all possible combinations and permutations.

Thus, such mechanism allows using one or more templates to improve the printing of non-saturated colored text and lines, as captured in the technique illustrated in FIG. 1.

As well, an enterprise in the printing industry, using embodiments herein, may advertise true 1200 dpi printing, instead of prior techniques which used true 600 dpi printing and approximated 2400 dpi printing.

In particular, by using the above-described, novel set of templates and subsequently some additional processing in the rip processing to drive such templates, true 1200 dpi rendering is achieved. For purposes of understanding herein, the additional processing in the rip processing is CPU computations because generating 1200 dpi data may be more CPU-intensive that 600 dpi as there is four times the data for the same sized page.

As well, it should be appreciated that embodiments herein result in a resolution for printing that is approximately 600 dpi or 1200 dpi.

An Example Auxiliary Data Tag Chart

Figure 5:
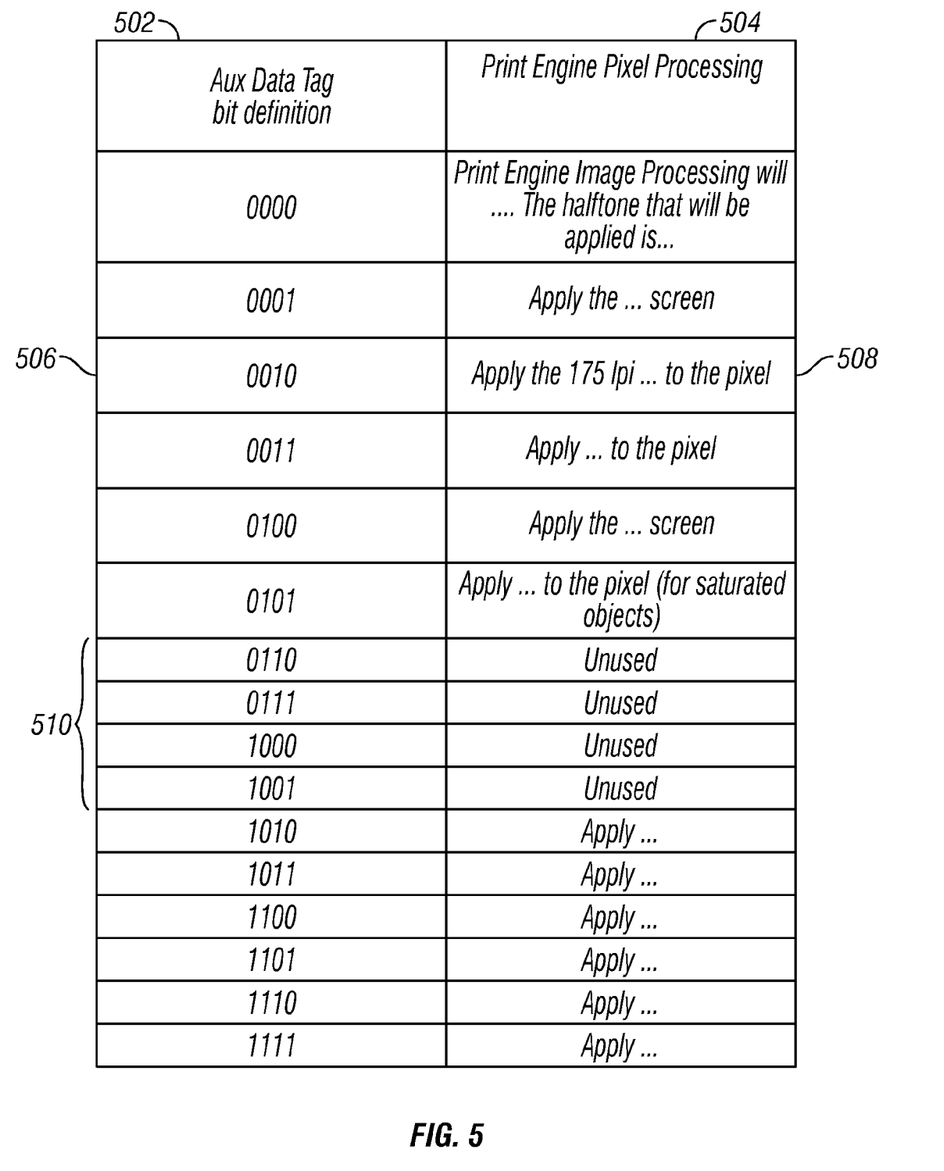
FIG. 5 is example of an auxiliary data tag chart, according to an embodiment.

An example of an auxiliary data tag chart can be understood with reference to FIG. 5. The left-hand column 502 lists the auxiliary data tag bit definition. The right-hand column 504 lists each of the uses of the bits for the tag. For example, bit 0010 (506), the use is to apply the 175 lpi screen family to the pixel 508. For purposes of understanding, one concept behind the use of these tags is for printing text or for printing photographs. The print professional or end-user or processor may want to apply a higher frequency of halftone for text and a lower frequency of halftone for photos. Thus, use of such tags allows the printing process to select some of the available internal screens.

In an embodiment, inventive templates for 1200 dpi processing are loaded into a system that may already use tags and templates or internal screens as described hereinabove. In the embodiment, one or more unused tag values may be employed. For example, referring to FIG. 5, tags six through nine (shown in binary form as 0110, 0111, 1000, and 1001) 510 may be used to insert specific tag values that are programmed for inventive 1200-by-two template combinations.

It should be appreciated that prior art techniques may have developed anti-alias rendering and edge-enhancement technology. However, such anti-aliasing has limitations because the theory involves deriving what is thought to be there. In contrast and importantly the embodiments described herein using the 1200-by-two approach are based on actual information rather than just inference. For example, with the antialiasing approach, the algorithm may infer that an angled line is supposed to be the figure or part of text and proceeds to fill in a few bits to try to make that line smooth.

An Example Printout

Figure 6:
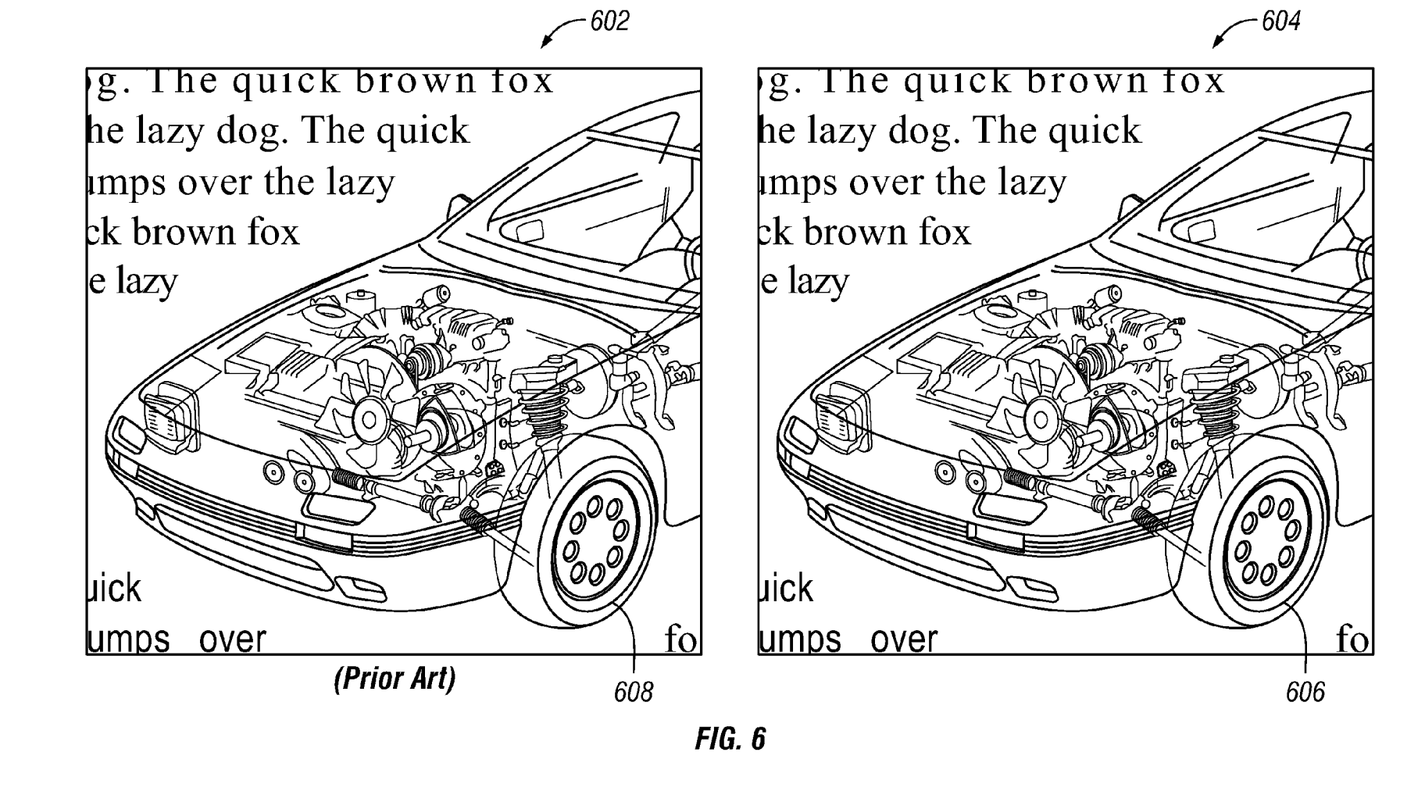
FIG. 6 contains an example printout using 1200 dpi, according to an embodiment.

An example printout is shown in FIG. 6. The left-hand image 602 was produced using prior art techniques, such as template which enhance only full saturated text and lines. The right-hand image 604 was produced by using 1200 dpi techniques as described herein. That is, image 604 readily illustrates how text, e.g. "brown" or "quick", have better resolution than same in image 602. Similarly, image 604 shows better resolution of the details of the left-front tire 606 than the resolution of the tire 608 in image 602, for example.

An Example Machine Overview

Figure 7:
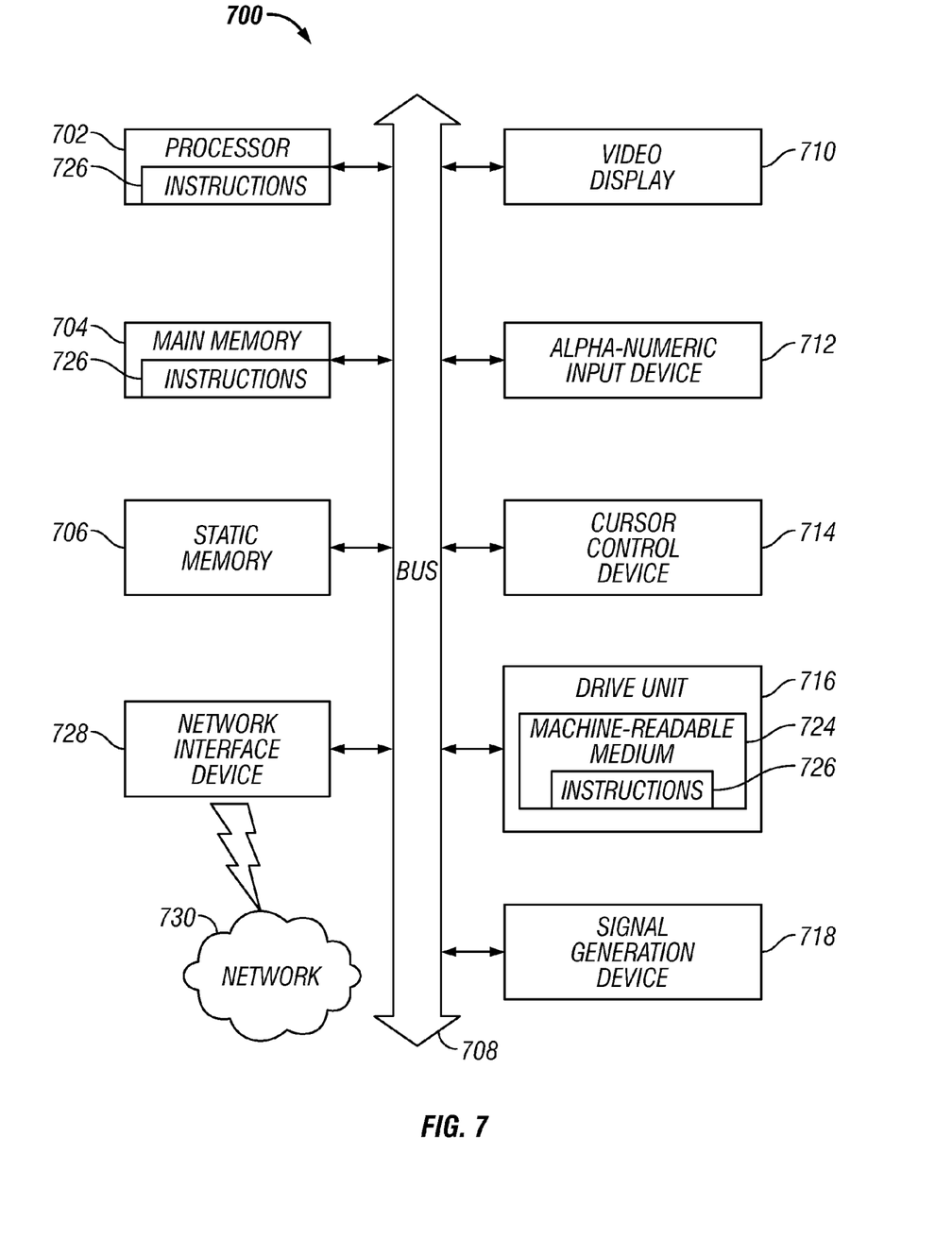
FIG. 7 is a block schematic diagram of a system in the exemplary form of a computer system according to an embodiment.

FIG. 7 is a block schematic diagram of a system in the exemplary form of a computer system 700 within which a set of instructions for causing the system to perform any one of the foregoing methodologies may be executed. In alternative embodiments, the system may comprise a network router, a network switch, a network bridge, personal digital assistant (PDA), a cellular telephone, a Web appliance or any system capable of executing a sequence of instructions that specify actions to be taken by that system.

The computer system 700 includes a processor 702, a main memory 704 and a static memory 706, which communicate with each other via a bus 708. The computer system 700 may further include a display unit 710, for example, a liquid crystal display (LCD) or a cathode ray tube (CRT). The computer system 700 also includes an alphanumeric input device 712, for example, a keyboard; a cursor control device 714, for example, a mouse; a disk drive unit 716, a signal generation device 718, for example, a speaker, and a network interface device 720.

The disk drive unit 716 includes a machine-readable medium 724 on which is stored a set of executable instructions, i.e. software, 726 embodying any one, or all, of the methodologies described herein below. The software 726 is also shown to reside, completely or at least partially, within the main memory 704 and/or within the processor 702. The software 726 may further be transmitted or received over a network 728, 730 by means of a network interface device 720.

In contrast to the system 700 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Cloud Overview

It is to be understood that embodiments may include performing computations with cloud computing. For the purposes of discussion herein, cloud computing may mean executing algorithms on any network that is accessible by internet-enabled devices, servers, or clients and that do not require complex hardware configurations, e.g. requiring cables, and complex software configurations, e.g. requiring a consultant to install. For example, embodiments may provide one or more cloud computing solutions that enable users, e.g. users on the go, to print using halftoning anywhere on such internet-enabled devices, servers, or clients. It further should be appreciated that one or more cloud computing embodiments include printing with halftoning using mobile devices, tablets, and the like, as such devices are becoming standard consumer devices.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer-implemented method for halftoning, comprising the steps of:
    dividing a $\frac{1}{600}^{th}$ square within a 600 dpi pixel into four quadrants, each quadrant having eight bits;
    for each quadrant, using two bits of the eight bits for programming a contone level, said contone level being from the set of: zero, one, two, and three;
    setting a tag bit for the 600 dpi pixel to a particular template from a set of templates; and
    using the particular template as two bits per pixel at 1200 dpi;
    wherein the particular template requires not using any of its eight bits for contone or any of its eight bits for representing a binary four-by-four square within a 600 dpi pixel; and
    wherein at least one of the steps is performed by a processor.

2. The method of claim 1, wherein the two bits per pixel at 1200 dpi are from a set comprising:
    a first code to represent a 2-by-2 matrix of binary pixels in the top left corner with no saturation;
    a second code to represent a 2-by-2 matrix of binary pixels in the top right corner having full saturation in the two rightmost pixels;
    a third code to represent a 2-by-2 matrix of binary pixels at the bottom left corner with full saturation in the two leftmost pixels; and
    a fourth code to represent to a 2-by-2 matrix of binary pixels at the bottom right corner with full saturation in all four of the pixels.

3. An apparatus for halftoning, comprising:
    a dividing processor configured for dividing a $\frac{1}{600}^{th}$ square within a 600 dpi pixel into four quadrants, each quadrant having eight bits;

a processor configured for using, for each quadrant, two bits of the eight bits for programming a contone level, said contone level being from the set of: zero, one, two, and three;

a setting processor configured for setting a tag bit for the 600 dpi pixel to a particular template from a set of templates; and a processor configured for using the particular template as two bits per pixel at 1200 dpi;

wherein the particular template requires not using any of its eight bits for contone or any of its eight bits for representing a binary four-by-four square within a 600 dpi pixel; and wherein at least one of the steps is performed by a processor.

4. The apparatus of claim 3, wherein the two bits per pixel at 1200 dpi are from a set comprising:

a first code to represent a 2-by-2 matrix of binary pixels in the top left corner with no saturation;

a second code to represent a 2-by-2 matrix of binary pixels in the top right corner having full saturation in the two rightmost pixels;

a third code to represent a 2-by-2 matrix of binary pixels at the bottom left corner with full saturation in the two leftmost pixels; and a fourth code to represent to a 2-by-2 matrix of binary pixels at the bottom right corner with full saturation in all four of the pixels.

5. A non-transitory computer readable medium having stored thereon a computer program for halftoning, said computer program comprising a program code which, when executed by a processor, performs the steps of:

dividing a $\frac{1}{600}^{th}$ square within a 600 dpi pixel into four quadrants, each quadrant having eight bits;

for each quadrant, using two bits of the eight bits for programming a contone level, said contone level being from the set of: zero, one, two, and three;

setting a tag bit for the 600 dpi pixel to a particular template from a set of templates; and using the particular template as two bits per pixel at 1200 dpi;

wherein the particular template requires not using any of its eight bits for contone or any of its eight bits for representing a binary four-by-four square within a 600 dpi pixel.

6. The non-transitory computer readable medium of claim 5, wherein the two bits per pixel at 1200 dpi are from a set comprising:

a first code to represent a 2-by-2 matrix of binary pixels in the top left corner with no saturation;

a second code to represent a 2-by-2 matrix of binary pixels in the top right corner having full saturation in the two rightmost pixels;

a third code to represent a 2-by-2 matrix of binary pixels at the bottom left corner with full saturation in the two leftmost pixels; and a fourth code to represent to a 2-by-2 matrix of binary pixels at the bottom right corner with full saturation in all four of the pixels.

* * * * *